US011097693B2

(12) United States Patent
Moneyron et al.

(10) Patent No.: US 11,097,693 B2
(45) Date of Patent: Aug. 24, 2021

(54) ADVANCED ADAPTER FOR A WIPER BLADE OF A MOTOR VEHICLE, AND ASSEMBLY COMPRISING SUCH AN ADAPTER

(71) Applicant: Valeo Systèmes d'Essuyage, Le Mesnil Saint Denis (FR)

(72) Inventors: Patrick Moneyron, Issoire (FR); Philippe Espinasse, Issoire (FR); William Terrasse, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 259 days.

(21) Appl. No.: 16/044,766

(22) Filed: Jul. 25, 2018

(65) Prior Publication Data
US 2019/0031151 A1 Jan. 31, 2019

(30) Foreign Application Priority Data
Jul. 31, 2017 (FR) ...................................... 1757282

(51) Int. Cl.
*B60S 1/40* (2006.01)
*B60S 1/38* (2006.01)

(52) U.S. Cl.
CPC ........... *B60S 1/4048* (2013.01); *B60S 1/3806* (2013.01); *B60S 1/387* (2013.01); *B60S 2001/4051* (2013.01); *B60S 2001/4054* (2013.01)

(58) Field of Classification Search
CPC ........ B60S 1/40; B60S 1/4003; B60S 1/4038; B60S 1/4045; B60S 1/4048; B60S 2001/4054; B60S 2001/4051

(Continued)

(56) References Cited

U.S. PATENT DOCUMENTS 7,690,074 B2   4/2010  Ostrowski
2013/0111691 A1   5/2013  Ozer et al.
2016/0375872 A1*  12/2016  Mouleyre ............. B60S 1/4048
                                                15/250.32

FOREIGN PATENT DOCUMENTS

CN   101312861 A   11/2008
CN   102596659 A   7/2012
(Continued)

OTHER PUBLICATIONS

Machine translation of description portion of German publication 10130903, published May 2002. (Year: 2002).*

(Continued)

*Primary Examiner* — Gary K. Graham
(74) *Attorney, Agent, or Firm* — Osha Bergman Watanabe & Burton LLP

(57) ABSTRACT

The invention proposes an adapter (26) for a windscreen wiper, having a body (25) which is delimited by two external lateral faces (29a, 29b) and which is configured to be mounted in a complementary yoke (28) of a wiper arm having a pair of front locking pegs (44a) and an abutment surface (39) which cooperate with associated parts of the adapter, each of the lateral faces of the adapter (26) having a front locking notch (59) which receives a front locking peg (44b), and wherein the adapter (26) is provided with a resilient branch (62) bearing an unlocking button (64) which cooperates with the abutment surface (39), characterized in that the resilient branch (62) extends longitudinally beyond a transverse end face (27b) of the body (25) of the adapter (26).

9 Claims, 6 Drawing Sheets

(58) Field of Classification Search
USPC .................................................. 15/250.32
See application file for complete search history.

(56) References Cited

FOREIGN PATENT DOCUMENTS

| | | | |
|---|---|---|---|
| CN | 106687341 | A | 5/2017 |
| DE | 10130903 | A1 | 5/2002 |
| DE | 10065124 | A1 | 7/2002 |
| DE | 10257988 | * | 2/2004 |
| EP | 3131796 | A1 | 2/2017 |
| WO | 02053421 | A1 | 7/2002 |

OTHER PUBLICATIONS

Machine translation of description portion of WO publication 02/053421, published Jul. 2002. (Year: 2002).*
Preliminary Search Report and Written Opinion issued in corresponding French Application No. 1757282, dated Apr. 10, 2018 (6 pages).
The First Office Action issued in corresponding Chinese Application No. 201810841619 3, dated May 24, 2021 (12 pages).

\* cited by examiner

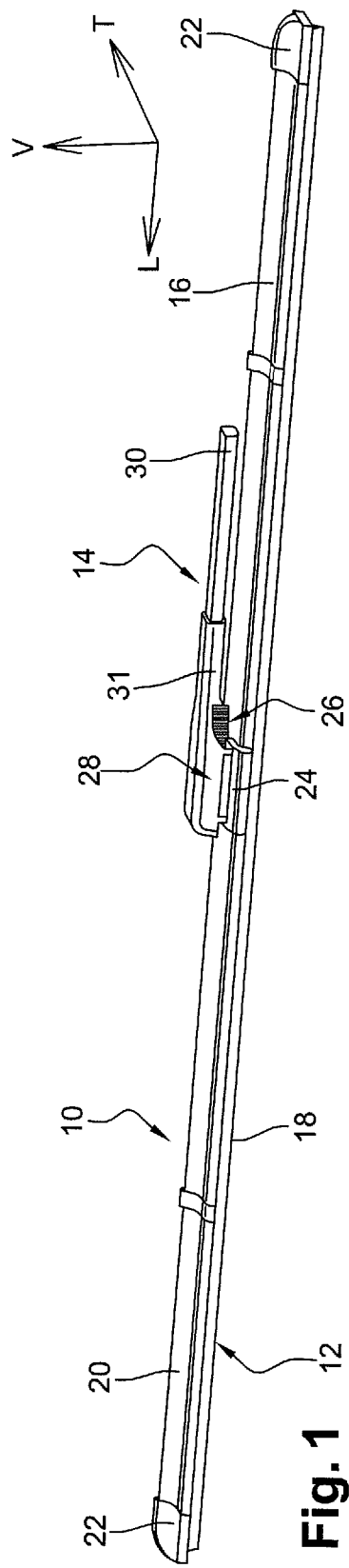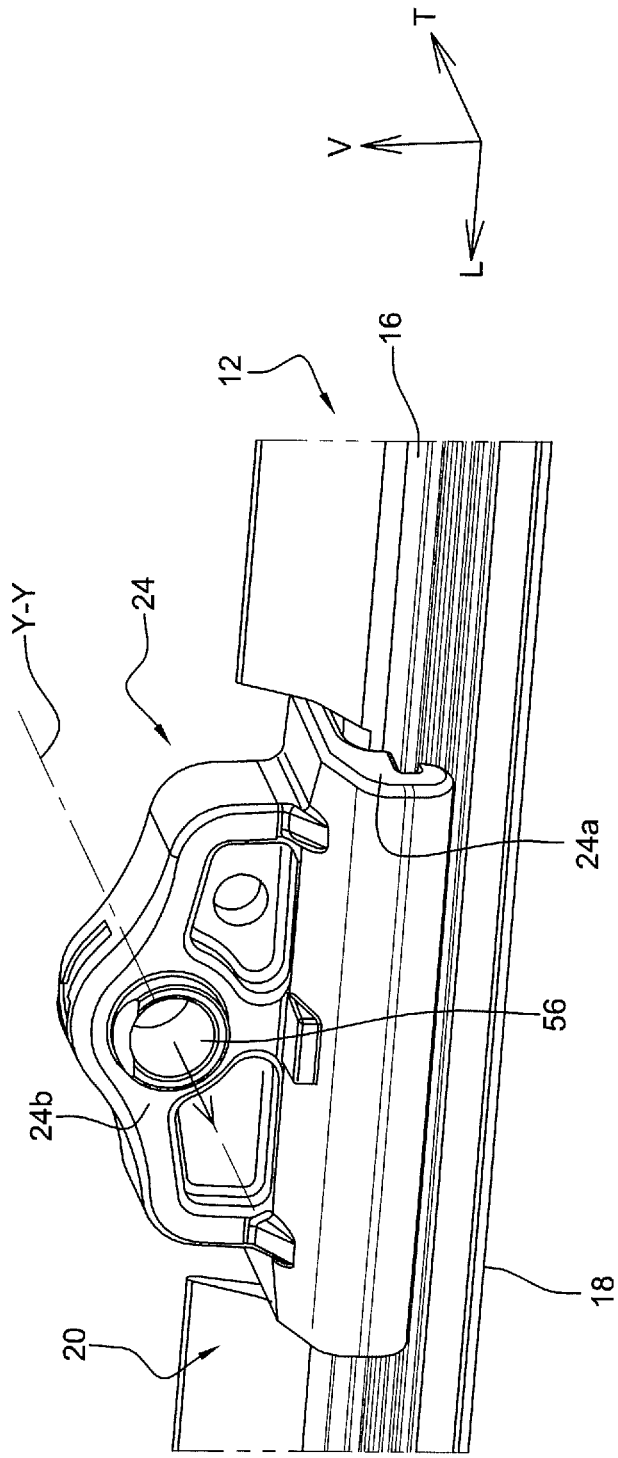
Fig. 1
Fig. 2

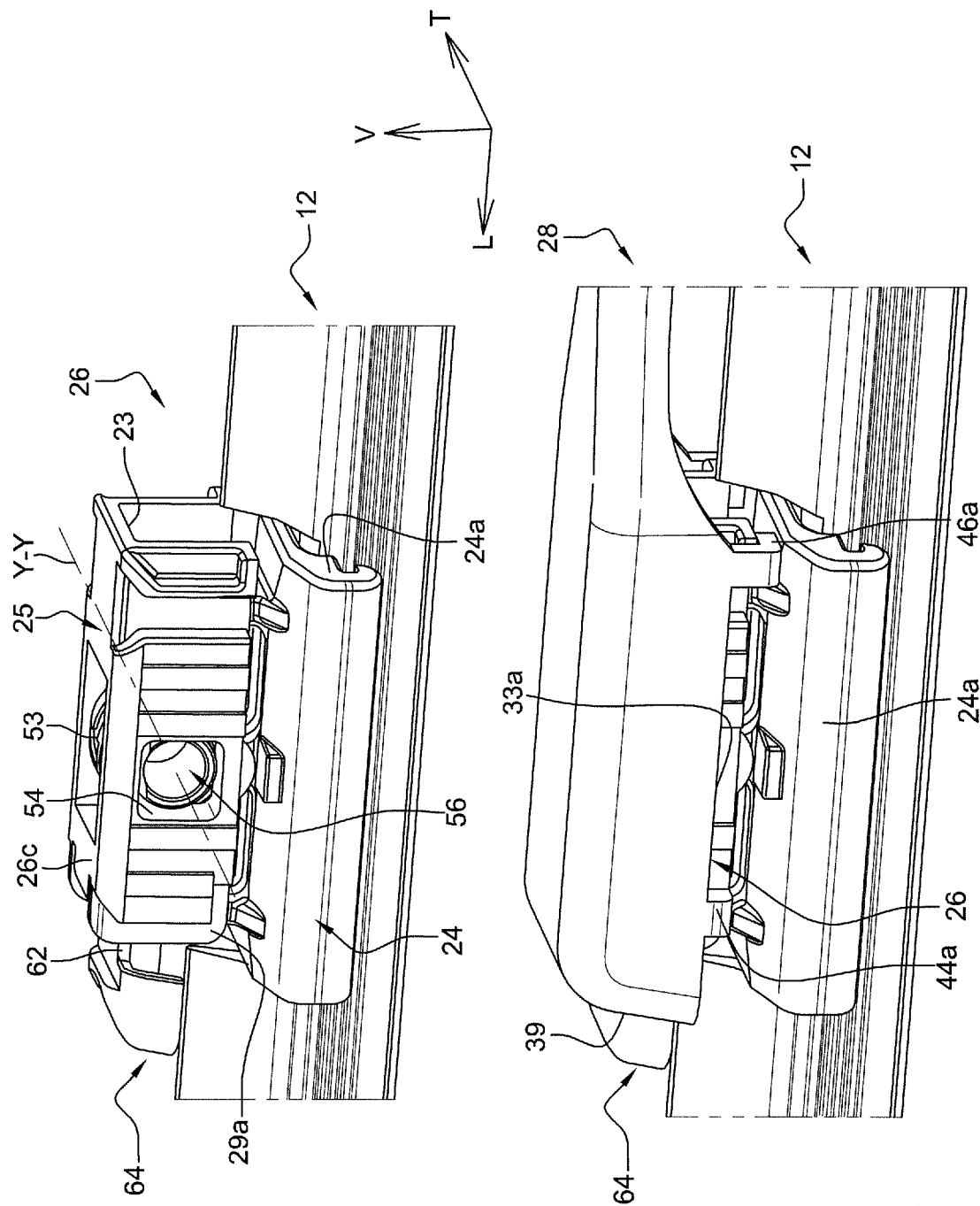

ADVANCED ADAPTER FOR A WIPER BLADE OF A MOTOR VEHICLE, AND ASSEMBLY COMPRISING SUCH AN ADAPTER

TECHNICAL FIELD OF THE INVENTION

The invention relates notably to an adapter for a windscreen wiper, in particular a motor vehicle windscreen wiper.

The invention also relates to an assembly having a wiper arm and an adapter according to the invention.

The invention also relates to an assembly having a wiper blade and a connection system intended to join the wiper blade to a driving arm, said connection system comprising a connector fixed to the wiper blade and an adapter according to the invention.

TECHNICAL BACKGROUND OF THE INVENTION

A motor vehicle is conventionally equipped with windscreen wipers, notably for wiping the outer surface of the windscreen and thereby avoiding disruption to the driver's view of his surroundings.

A windscreen wiper generally comprises a driving arm that effects a, notably angular, back-and-forth movement, and a longitudinally elongate wiper blade that bears a blade rubber or squeegee blade made of a resilient material such as rubber or an elastomer material.

The blade rubber rubs against the outer surface of the windscreen and evacuates the water by removing it from the driver's field of view.

In a conventional version, the wiper blade is realized in the form of articulated brackets which retain the squeegee blade at several discrete locations that are distributed longitudinally, conferring a bend thereon that allows it to closely follow the curvature of the windscreen.

In a more recent version known as "flat blade", the wiper blade is realized in the form of a semi-rigid assembly which holds the blade rubber along its entire length by virtue of one or more bending vertebrae that make it possible to press the wiper blade and the blade rubber against the windscreen without having to use brackets.

In both designs, the wiper blade is joined to the driving arm by a connection system having a complementary connector and adapter.

The connector is a part that is secured to the wiper blade, while the adapter is secured to the driving arm.

The adapter is an intermediate part which allows the connector to be joined and fastened to the driving arm. It is generally configured to be inserted to into a head or end piece, in the form of a yoke and having an inverted-U-shaped cross section, of the driving arm.

Each of these components (connector and adapter) comprises articulation means designed to cooperate with complementary means of the other component so as to define at least one transverse articulation axis of the two components with respect to one another, which is also the articulation axis of the wiper blade with respect to the driving arm.

In one configuration known in the art, one of the components, such as the connector, generally comprises a substantially cylindrical physical pin which defines the articulation axis and is received in a housing of complementary shape in the other component.

The adapter generally has an elongate body which is configured to be inserted into the front free end piece of the driving arm such that this body extends at least in part between two substantially parallel lateral walls of this end piece.

An adapter makes it possible to join a wiper blade to a particular type of end piece. In the case of the abovementioned end pieces with an inverted-U-shaped cross section, there are several varieties with different designs of means for locking the yoke on the adapter.

A wiper arm is known in which the end piece is a yoke of inverted-U-shaped cross section which has a pair of front locking pegs that are able to cooperate with associated notches of the adapter in order to fasten and lock the yoke on the adapter in a removable manner, the latter having complementary locking means that are able to cooperate with associated means of the yoke, such as, for example, a resilient branch bearing an unlocking button which is able to cooperate with an abutment surface of the yoke in order to longitudinally immobilize the adapter in one direction with respect to the yoke.

An example of an adapter design suitable for this type of yoke is illustrated for example in the document U.S. Pat. No. 7,690,074.

The invention proposes an improved adapter of this type which is simple, effective and economical, and particularly easy to mount and lock in the yoke, while ensuring a reliable connection between these two components after mounting.

BRIEF SUMMARY OF THE INVENTION

The invention proposes an adapter for a windscreen wiper, notably a motor vehicle windscreen wiper, having a body of longitudinally elongate shape which is delimited by two, longitudinal and vertical, external lateral faces and which is configured to be mounted in a complementary yoke of inverted-U-shaped cross section belonging to a wiper arm, this yoke having a pair of front locking pegs and an abutment surface which are able to cooperate with associated parts of the adapter in order to fasten the yoke to the adapter in a removable manner, each of the external lateral faces of the body of the adapter having a front locking notch, each of which is able to receive an associated front locking peg of the yoke, and the body of the adapter being provided with a resilient branch bearing an unlocking button which is able to cooperate with the abutment surface of the yoke in order to longitudinally immobilize the adapter in one direction with respect to the yoke, characterized in that the resilient branch extends longitudinally beyond a transverse end face of the body.

According to other features of the adapter:

the unlocking button is arranged at the end of the resilient branch;

the unlocking button has a transversely oriented locking surface that is able to cooperate with the abutment surface of the yoke, said locking surface extending preferably at the rear of the unlocking button;

the locking surface extends in a vertical plane;

the unlocking button is offset vertically downwards with respect to an upper face of the body of the adapter;

the unlocking button has, when seen from below, that is to say when seen from the wiper blade when the adapter is positioned on the latter, a U shape, thus comprising at least two branches joined together by a base;

the base of the U shape adopted by the unlocking button extends in a direction perpendicular to a main axis of extension of the adapter;

the two branches and the base of the U shape adopted by the unlocking button delimit a space that is open in the direction of the wiper blade when the adapter is arranged on this wiper blade;

the unlocking button comprises a solid upper face which joins at least the two branches of the U shape together, this upper face being separate from the base of the U shape;

each of the longitudinal lateral faces of the body of the adapter has a front vertical slot that is open at its two ends, each slot being able to receive an associated peg of the yoke in a sliding manner, each of the longitudinal lateral faces having, at its lower end, an associated locking notch, each front vertical slot opening into the associated notch;

each of the longitudinal lateral faces of the body of the adapter has a rear vertical slot that is open at its two ends, each slot being able to receive an associated peg of the yoke in a sliding manner, each of the longitudinal lateral faces having, at its lower end, an associated locking notch, each rear vertical slot opening into the associated notch;

the resilient branch extends longitudinally beyond a front transverse end face of the body, the resilient branch, in the mounted and fixed position of the yoke on the adapter, extending next to an internal face of a front transverse end wall of the yoke.

The invention also proposes an assembly having a wiper arm and an adapter according to the invention, characterized in that the yoke of the wiper arm has a vertically oriented front transverse end wall that has a cavity, and in that, in the mounted and locked position of the yoke on the adapter, the resilient branch extends longitudinally forwards through the cavity.

The invention also proposes an assembly having a wiper blade and a connection system intended to join the wiper blade to a driving arm, said connection system comprising a connector fixed to the wiper blade and an adapter according to the invention, the connector and the adapter being joined together by articulation means.

BRIEF DESCRIPTION OF THE FIGURES

Further features and advantages of the invention will become apparent from reading the following detailed description, for an understanding of which reference is made to the appended drawings, in which:

FIG. 1 is a schematic perspective view of a windscreen wiper having a wiper blade and a driving arm joined together by a connection system comprising a connector and an adapter, the driving arm having a rod and an end yoke;

FIG. 2 is a large-scale perspective view which illustrates the connector secured directly to the wiper blade;

FIG. 3 is a view similar to the one in FIG. 2, which illustrates the adapter in its mounted position on the connector;

FIG. 4 is a view similar to the one in FIG. 3, which illustrates the end yoke in its mounted and locked position on the adapter according to the invention;

DETAILED DESCRIPTION OF THE FIGURES

Figure 5:
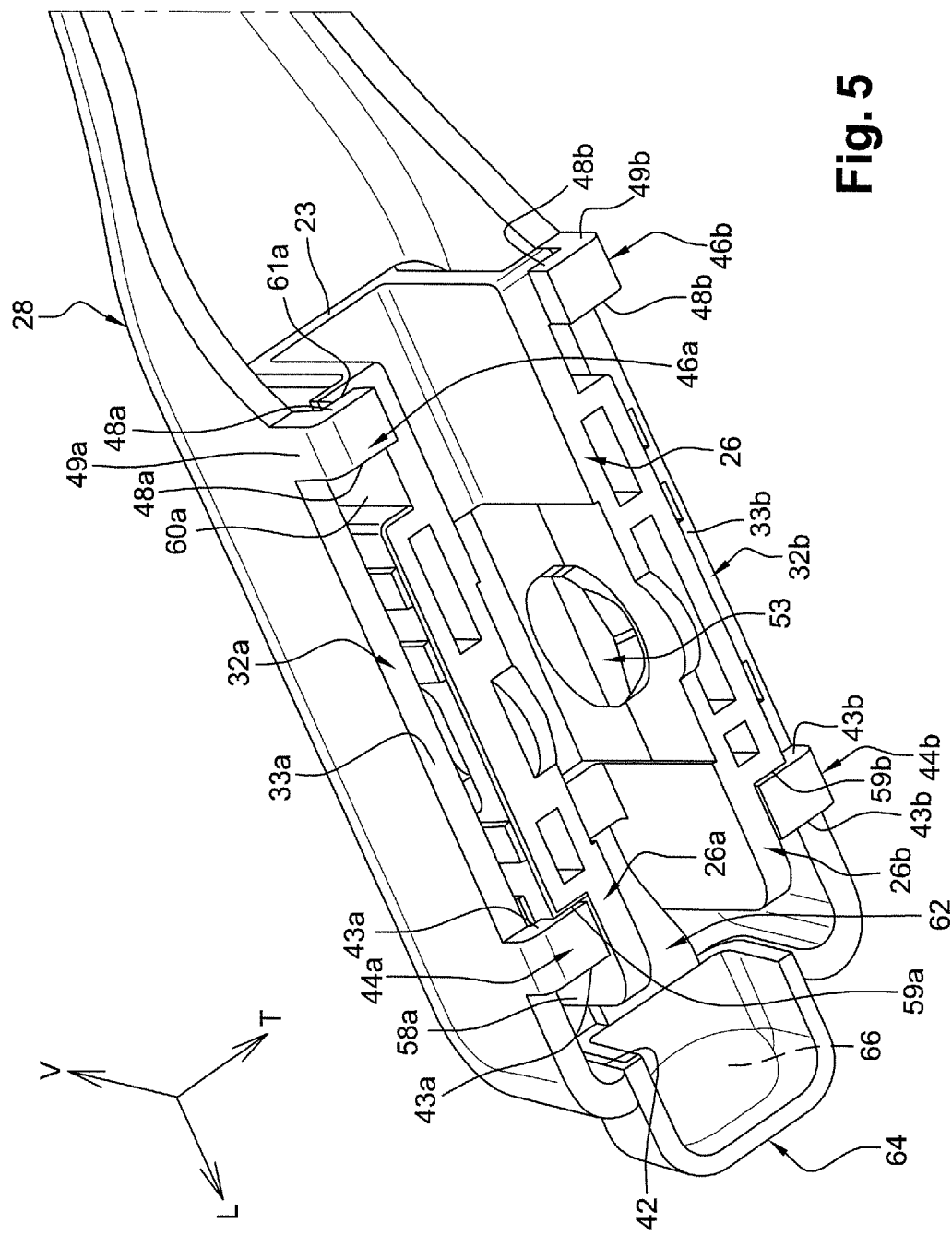
FIG. 5 is a perspective view from below, which illustrates on a large scale the end yoke in its mounted and locked position on the adapter according to the invention.

In the rest of the description, elements having an identical structure or similar functions will be denoted by the same references.

In the rest of the description, longitudinal, vertical and transverse orientations, indicated by the "L,V,T" trihedron in the figures, will be adopted in a non-limiting manner. A horizontal plane that extends longitudinally and transversely is also defined.

Thus, in the description, the terms longitudinal, vertical or transverse refer to the orientation of the wiper blade or of the driving arm.

The longitudinal direction corresponds to the main axis of the wiper blade or of the driving arm in which it extends from the rear to the front along the orientation of the axis L of the L, V, T trihedron.

The lateral orientations correspond for their part to concurrent straight lines, that is to say which cross the longitudinal direction, notably being perpendicular to the longitudinal axis of the wiper blade or of the driving arm.

The terms rear or front are to be understood with respect to the point at which the blade is fastened to the arm, the term rear corresponding to the part where the arm and a half-blade extend, or with respect to the point at which the arm is fastened to the vehicle.

The terms internal, external, inner or outer can refer to a part in its entirety and relate for example to the inside or outside of this part.

FIG. 1 illustrates a windscreen wiper 10 having notably a wiper blade 12 and a driving arm 14 (also known as wiper arm) for driving the wiper blade 12.

The blade 12 is in this case of the flat-blade type and comprises a longitudinal body 16, a blade rubber 18, generally made of rubber or of elastomer material, and at least one vertebra (not shown) which stiffens the blade rubber and encourages it to press against the outer surface of a vehicle window such as a curved windscreen (not shown) of the vehicle.

The longitudinal body 16 of the wiper blade 12 has an upper aerodynamic deflector 20 intended to improve the operation of the wiping system, this deflector having the function of improving the pressing of the wiper blade 12 against the windscreen and thus of improving the aerodynamic performance of the windscreen wiper 10.

The wiper blade 12 further has end fittings 22 or clips for attaching the blade rubber 18 and the vertebra to the longitudinal body 16, these fittings 22 being situated at each of the two opposite, front and rear, longitudinal ends of the longitudinal body 16.

The driving arm 14 is intended to be driven by a motor to follow a back-and-forth movement, for example an alternating angular movement, that allows the blade rubber 18 to evacuate water and possibly other undesirable elements with which the outer surface of the windscreen is covered.

Approximately half-way along, the wiper blade 12 comprises a connection assembly having an intermediate connector 24 and an adapter 26.

The adapter 26 is in this case a part produced by moulding in one piece and it has symmetry of design with respect to a longitudinal and vertical mid plane. Preferably, the adapter according to the invention is made of plastics material.

The adapter 26 secured to the arm 14 is mounted on the connector 24 so as to maintain a degree of freedom to rotate about a transverse articulation axis Y-Y which is substantially perpendicular to the longitudinal axis of the wiper blade 12.

This degree of freedom allows rotation in the two directions of the wiper blade 12 with respect to the driving arm 14 and thus allows the wiper blade 12 to follow the curvature of the windscreen as it moves.

The adapter 26 provides the connection of the wiper blade 12 to the wiper arm 14 and, in particular, to a head or front longitudinal end piece of the driving arm 14 which may be formed in one piece with the driving arm or be attached and fastened thereto.

In the figures, the end piece of the driving arm is a front free-end portion in the form of a yoke 28 with a substantially inverted-U-shaped cross section.

By way of non-limiting example, the yoke 28 has an elongate shape which extends along a longitudinal axis which is generally substantially parallel to the longitudinal general axis of the wiper blade 12.

The yoke 28 comprises a rear part 31 for connecting to the rest of the driving arm 14, which in this case has an arm rod 30 to which the yoke 28 is for example fastened by crimping.

In cross section through a vertical and transverse plane, the yoke 28 has a substantially inverted-U-shaped cross section.

Figure 6:
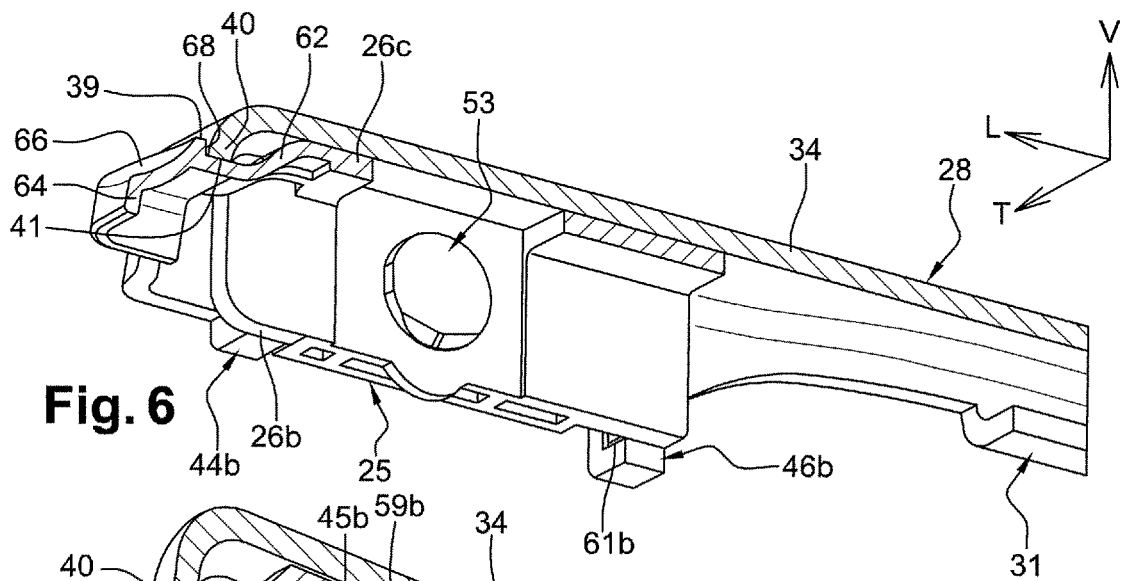
FIG. 6 is a cross-sectional view on a longitudinal and vertical mid-plane of the assembly illustrated in FIG. 5.
Figure 7:
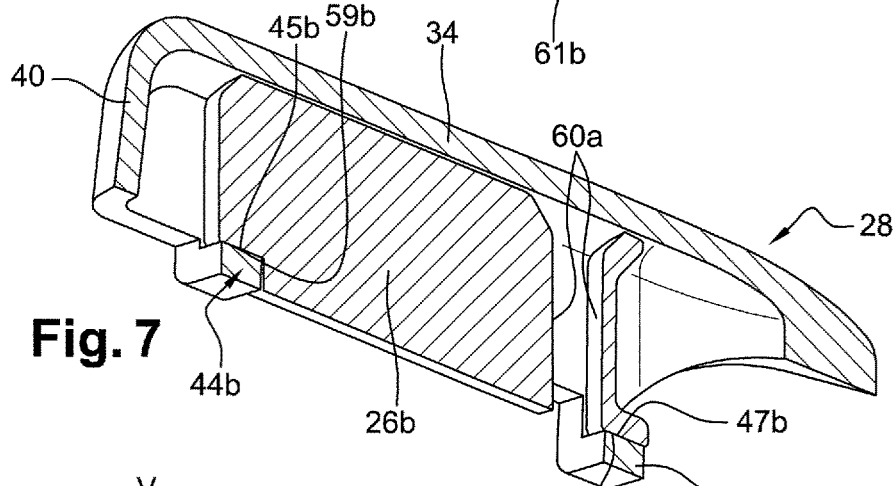
FIG. 7 is a cross-sectional view similar to the one in FIG. 6, on another longitudinal and vertical plane passing through the front and rear locking pegs of the end yoke.
Figures 8, 9:
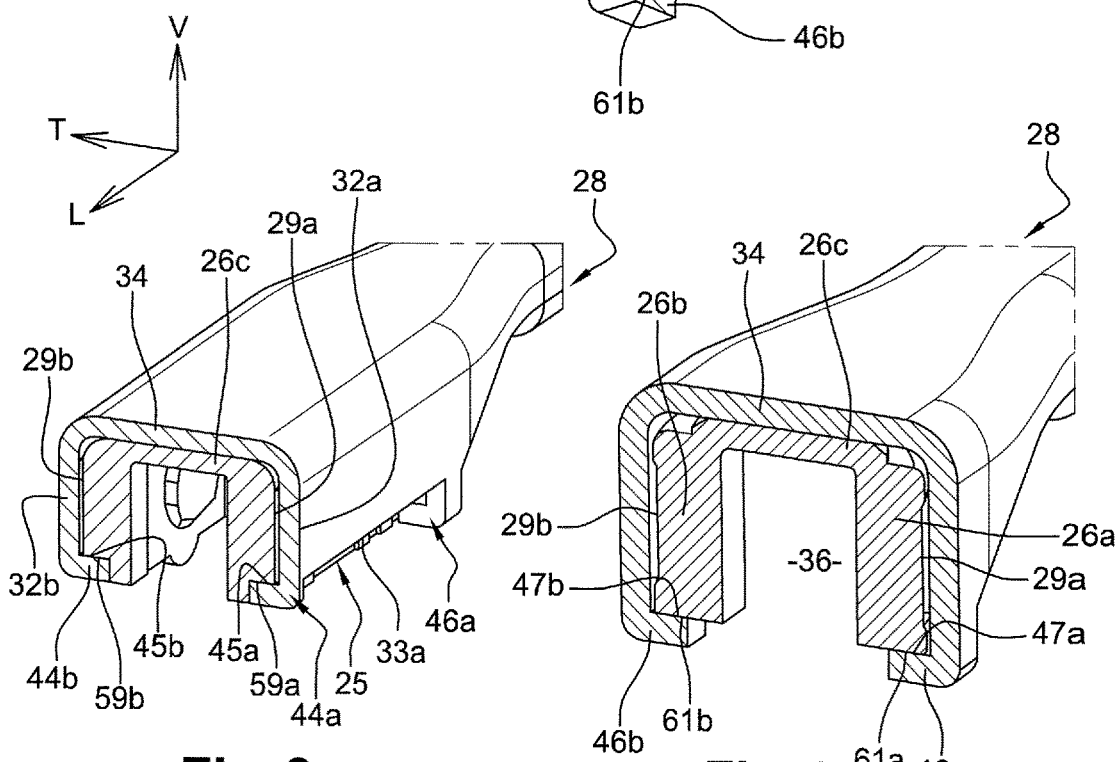
FIG. 8 is a view of the assembly illustrated in FIG. 5, in cross section through a transverse and vertical plane passing through the front locking pegs of the end yoke.
FIG. 9 is a view of the assembly illustrated in FIG. 5, in cross section through a transverse and vertical plane passing through the rear locking pegs of the end yoke.
Figure 10:
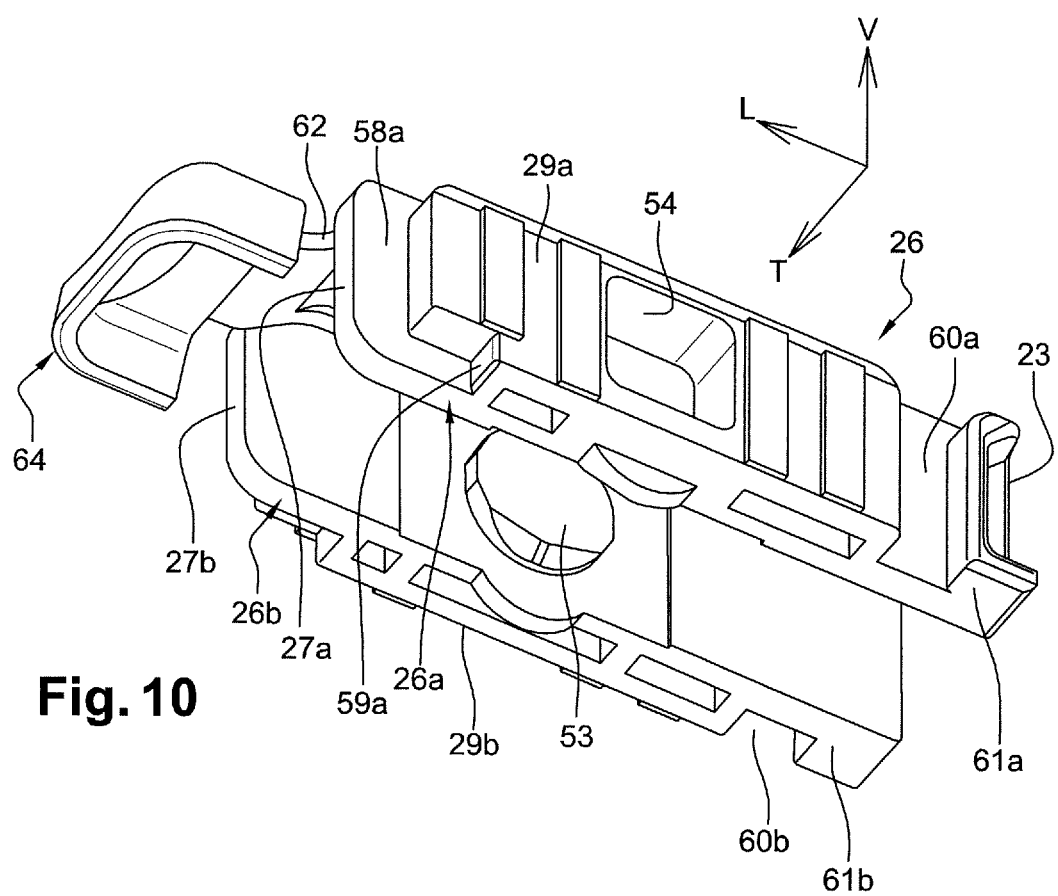
FIGS. 10 and 11 are two large-scale views of the adapter according to the invention, which is illustrated in perspective at two different viewing angles.
Figure 13:
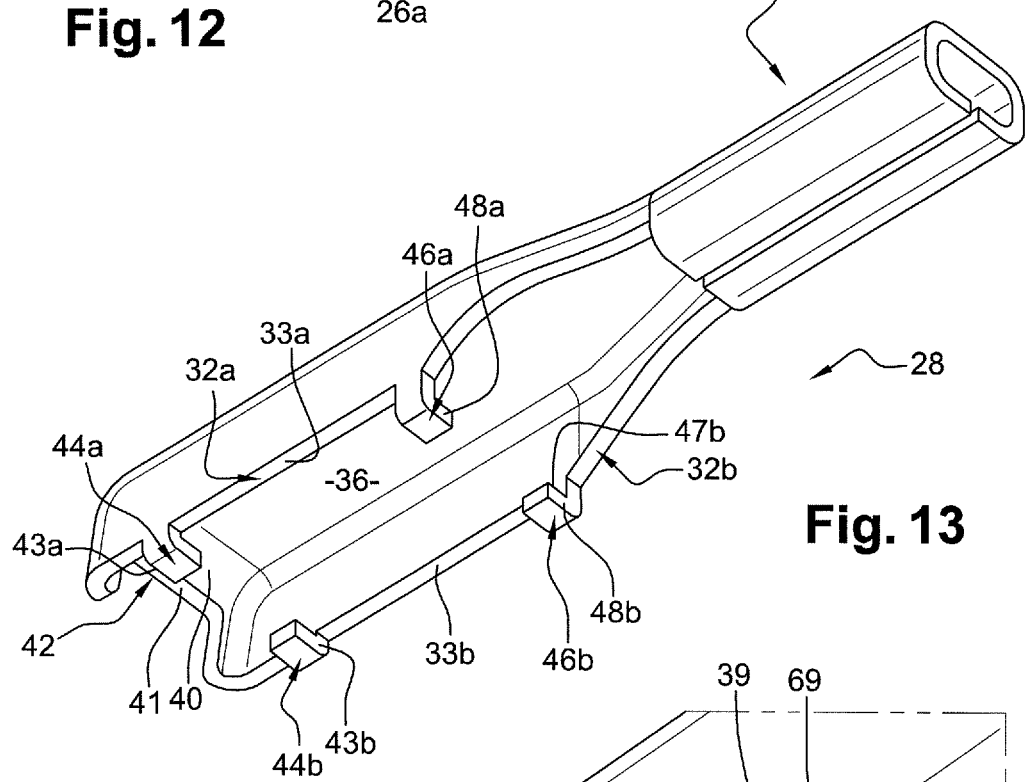
FIG. 13 is a large-scale perspective view from below of the end yoke of the wiper arm.

As illustrated in detail in FIGS. 5, 6 and 13, the yoke 28 comprises two longitudinally oriented vertical lateral walls 32a, 32b, the upper longitudinal edges of which are joined together by a longitudinally oriented upper transverse wall 34. The walls 32a, 32b and 34 delimit an inner space 36 for accommodating the adapter 26 between one another.

At their front ends, the lateral walls 32a, 32b are joined together by a front vertical transverse wall 40 which has a central cavity 42 of rectangular contour which opens out vertically downwards into the lower transverse edge of the front wall 40.

The cavity 40 is delimited vertically upwards by a transverse horizontal edge 41 which is adjacent to an upper portion 39 of the external face of the front transverse wall 40 of the yoke 28.

The lateral walls 32a, 32b are delimited vertically downwards by lower longitudinal edges 33a, 33b.

Each lower longitudinal edge 33a, 33b has, in the vicinity of its front end, a front locking peg 44a, 44b and, in the vicinity of its rear end, a rear locking peg 46a, 46b.

The front pegs form a pair of front locking pegs 44a, 44b which are aligned longitudinally, and the rear pegs form a pair of rear locking pegs 46a, 46b which are aligned longitudinally.

Each front locking peg 44a, 44b is in the form of a horizontal locking tab which extends transversely inwards and which is delimited by an upper horizontal face 45a, 45b, respectively.

Each horizontal locking tab 44a, 44b is also delimited by a pair of transverse and vertical faces 43a, 43b.

Each rear locking peg 46a, 46b is in the form of a horizontal locking tab which extends transversely inwards and which is delimited by an upper horizontal face 47a, 47b, respectively. Each horizontal locking tab 46a, 46b is also delimited by a pair of transverse and vertical faces 48a, 48b.

Each rear horizontal locking tab 46a, 46b is joined to the associated lower longitudinal edge 33a, 33b by a vertical connecting tab 49a, 49b.

The adapter 26 has an elongate main body 25 which is configured to be mounted in the internal space 36 of the yoke 28.

In cross section through a vertical transverse plane, the adapter has a substantially inverted U shape. It has two, vertical and longitudinal, lateral walls 26a, 26b which are delimited longitudinally towards the front by a vertical front longitudinal end edge 27a, 27b, respectively.

The two lateral walls 26a, 26b are joined together by a horizontal upper wall 26c which in this case comprises a central cavity 50 of elongate rectangular contour.

Each lateral wall 26a, 26b is delimited by a longitudinally and vertically oriented external lateral face 29a, 29b.

The body 25 of the adapter 26 is also delimited longitudinally toward the rear by a vertical and transverse rear face 23 which has a central cavity and an overall inverted U shape.

The lateral walls 26a, 26b comprise a transversely aligned orifice 54 and journal 53, respectively. These elements 53 and 54 are situated longitudinally substantially in the middle of the lateral walls 26a, 26b of the adapter 26. The elements 53 and 54 define the substantially transverse axis Y-Y of articulation in rotation of the connector 24 with respect to the adapter 26, and thus of the wiper blade 12 with respect to the driving arm 14.

The connector 24 comprises essentially a lower part 24a for crimping or fastening to the wiper blade 12 and an upper part 24b intended to be accommodated between the internal faces of the lateral walls 26a, 26b of the adapter 26.

The upper part 24b has complementary means 56 of the elements 53 and 54 that are intended to be aligned with the axis Y-Y.

In a variant that is not shown, either one of the adapter 26 and the connector 24 may have cylindrical journals that are centred on the axis Y-Y and are intended to be inserted by elastic snap-fastening into an orifice or complementary orifices in the other one of these components.

In order to receive an associated front locking peg 44a, 44b, each lateral wall 26a, 26b has—in the vicinity of its front end—an L-shaped front slot 58a, 58b which has a horizontal lower portion 59a, 59b which is open towards the front.

Each front locking peg 44a, 44b can be introduced into the associated slot 58a, 58b vertically from top to bottom and then slid longitudinally towards the rear in the lower portion 59a, 59b forming a front locking notch in order to realize "bayonet"-type mounting and locking.

This engaged position of the front locking pegs 44a, 44b in their locking notches 59a, 59b is illustrated in detail in FIGS. 5 to 8.

In order to receive an associated rear locking peg 46a, 46b, each lateral wall 26a, 26b has—in the vicinity of its rear end—a rectilinear vertical rear slot 60a, 60b which is continued by a horizontal lower facet 61a, 61b which is open towards the front so as to communicate with the vertical rear slot 60a, 60b.

Each rear locking peg 46a, 46b can be introduced into the associated vertical slot 60a, 60b vertically from top to bottom and then slid longitudinally under the associated horizontal facet 61a, 61b forming a rear locking notch in order to realize "bayonet"-type mounting and locking.

This engaged position of the rear locking pegs 46a, 46b in their rear locking notches is illustrated in detail in FIGS. 5 to 8.

The complementary means for locking the mounting of the yoke 28 on the adapter 26 will now be described, notably in order to avoid any accidental disconnection of the locking pegs 44a, 44b, 46a and 46b, while allowing controlled unlocking of this mounting.

To this end, at its front longitudinal end, the body 25 of the adapter 26 has in this case a resilient locking branch 62 which bears a button 64 for controlling unlocking.

The resilient branch 62 extends longitudinally beyond the transverse front end face of the body 25 of the adapter 26, which is defined notably by the vertical front longitudinal end edges 27a, 27b of the lateral walls 26a, 26b of the body 25.

Figure 11:
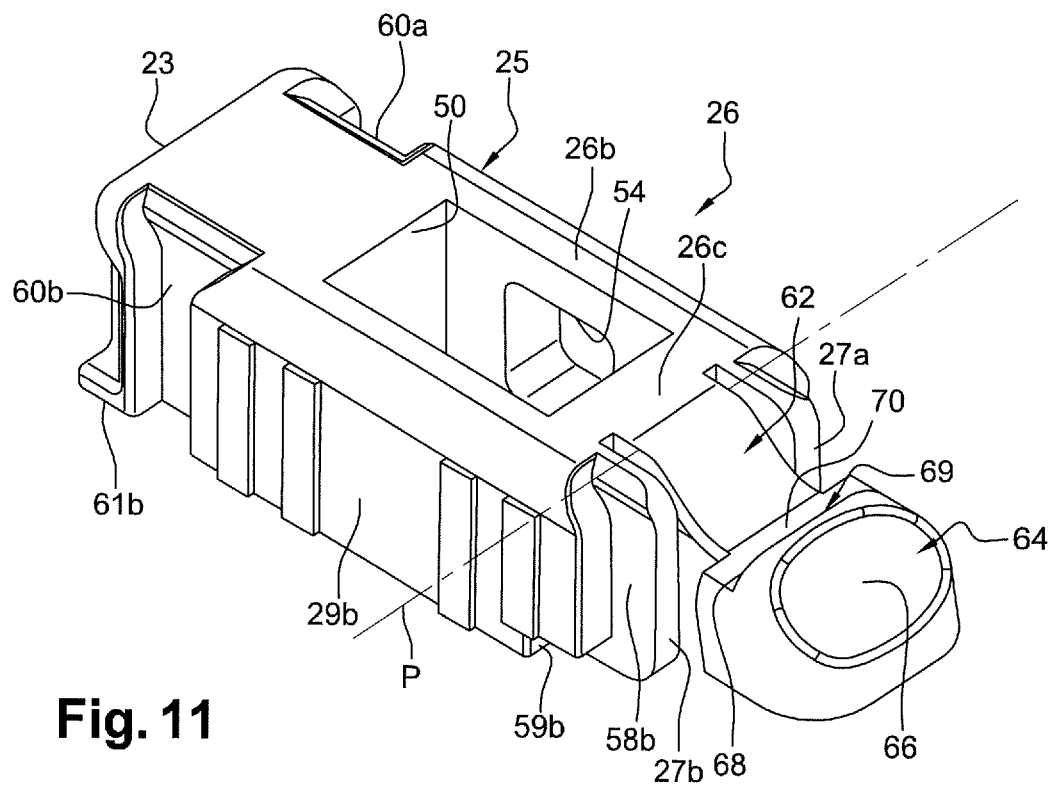

In order to have sufficient length and flexibility, and as can be seen notably in FIG. 11, the resilient branch 62 extends partially between the lateral walls 26a and 26b and in continuation of the horizontal upper wall 26c of the body 25.

In general terms, the unlocking button 64 has, when seen from below, that is to say when seen from the wiper blade 12 when the adapter 26 is positioned on the latter, a U shape, thus comprising at least two branches joined together by a base. As illustrated, this base of the U shape extends in a direction perpendicular to a main axis of extension of the adapter 26. According to the orientation of the adapter 26 in the figures, this base thus extends in a direction perpendicular to the longitudinal direction, i.e. perpendicular to the axis L of the illustrated trihedron. Moreover, the two branches and the base of this U shape delimit a space that is open in the direction of the wiper blade 12 when the adapter 26 is arranged on this wiper blade 12.

Finally, the unlocking button 64 comprises a solid upper face which joins at least the two branches of the U shape together, this upper face being separate from the base of the U shape.

The unlocking button 64 is arranged at the front free end of the resilient branch 62 and has, in its upper face, a concave shape 66 that is able to receive for example a user's fingertip.

Figure 12:
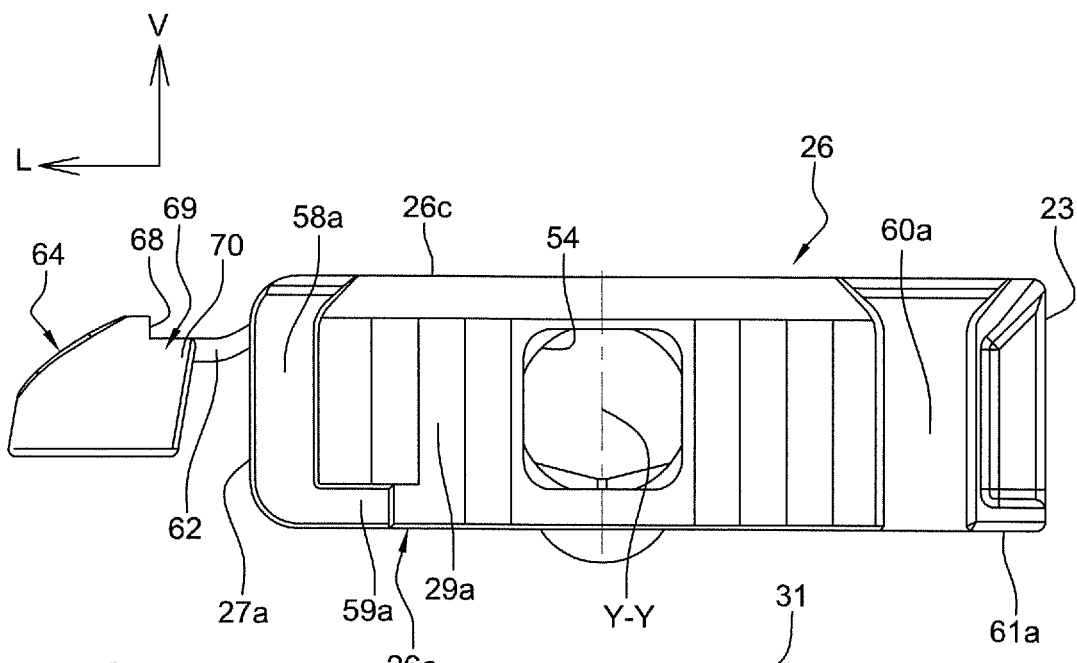
FIG. 12 is a large-scale side view of the adapter according to the invention.

As illustrated in FIG. 12, the unlocking button 64 is offset vertically downwards with respect to the upper face of the upper wall 26c of the body 25 of the adapter 26.

The unlocking button 64 is also offset longitudinally forwards with respect to the plane of the front transverse end face of the body 25 of the adapter 26.

In its rear part, the unlocking button 64 has a transversely oriented recess 69 with an L-shaped profile which is delimited by a rearwardly oriented vertical transverse locking surface 68 and by a horizontal transverse surface 70 which extends in continuation of the upper face of the resilient branch 62.

Figure 14:
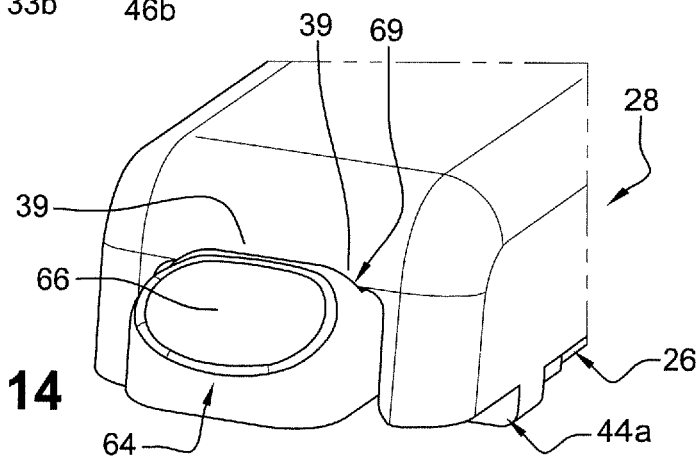
FIG. 14 is a perspective view which illustrates in detail the resilient branch with its locking button in the locking position in the end yoke.

As can be seen in FIGS. 6 and 14, the dimensions and the position of the locking surface 68 and the configuration of the resilient branch 62 are such that, in the mounted and locked position of the yoke 28 on the adapter 26, the locking surface 68 extends next to the abutment surface of the yoke that is formed by the upper portion 39 of the external face of the front transverse wall 40 of the yoke 28.

This surface portion 39 constitutes the abutment surface within the meaning of the invention.

In this same position, the transverse horizontal edge 41 of the cavity 40 is adjacent to the horizontal upper transverse surface 70 of the recess 69.

Preferably, the edge 41 and the horizontal upper transverse surface 70 of the recess 69 are in mutual contact in a manner elastically preloaded by a slight preload exerted by the resilient branch 62.

In order to allow the engagement and then the interlocking of the resilient branch 62 in the cavity 40, the resilient branch 62 is designed to deform elastically in a longitudinal vertical plane parallel to the external lateral faces 29a, 29b of the body 25 of the adapter 26.

To this end, in the vicinity of its longitudinal rear end, the resilient branch 62 is able to deform elastically and to pivot about a transverse geometric axis In order to bring about such elastic deformation for the purpose of unlocking, the user simply has to press the locking button 64, vertically from top to bottom.

In order to mount and lock the adapter 26 in the yoke 28, first of all the front locking pegs 44a and 44b are introduced vertically into the front vertical slots 58a, 58b and at the same time the rear locking pegs 46a and 46b are introduced into the rear vertical slots 60a, 60b, and then they are introduced longitudinally into the front locking notches 59a, 59b and under the horizontal facets 61a, 61b, respectively.

During the vertical downward movement, the lower transverse edge 41 of the cavity 40 cooperates with the facing portion of the upper surface of the locking button 64 in order to bring about the necessary elastic deformation and pivoting of the resilient branch.

The invention claimed is:

1. An adapter for a motor vehicle windscreen wiper, comprising:
   a body of longitudinally elongate shape which is delimited by two, longitudinal and vertical, external lateral faces and which is configured to be mounted in a complementary yoke of inverted-U-shaped cross section belonging to a wiper arm, the yoke having a pair of front locking pegs and an abutment surface which are able to cooperate with associated parts of the adapter in order to fasten the yoke to the adapter in a removable manner,
   wherein each of the external lateral faces of the body of the adapter having a front locking notch, each of which is able to receive an associated front locking peg of the yoke, the associated front locking peg extending transversely inwards, and
   the body of the adapter being provided with a resilient branch bearing an unlocking button which is able to cooperate with the abutment surface of the yoke in order to longitudinally immobilize the adapter in one direction with respect to the yoke,
   wherein the resilient branch extends longitudinally beyond an outermost transverse front end face of the body of the adapter, and the unlocking button is disposed at a front free end of the resilient branch,
   wherein each of the longitudinal lateral faces of the body of the adapter has a rear vertical slot that is open at both a first end and a second end, each slot being able to receive an associated peg of the yoke in a sliding manner, each of the longitudinal lateral faces having, at its lower end, an associated locking notch, each rear vertical slot opening into the associated notch.

2. The adapter according to claim 1, wherein the unlocking button has a transversely oriented locking surface that is able to cooperate with the abutment surface of the yoke, said locking surface extending at a rear of the unlocking button.

3. The adapter according to claim 2, wherein the locking surface extends in a vertical plane.

4. The adapter according to claim 1, wherein the unlocking button is offset vertically downwards with respect to an upper face of the body of the adapter.

5. The adapter according to claim 1, wherein each of the longitudinal lateral faces of the body of the adapter has a front vertical slot that is open at a first end and a second end, each front vertical slot being able to receive an associated peg of the yoke in a sliding manner, each front vertical slot associated with one front locking notch, and each front vertical slot opening into the associated front locking notch.

6. The adapter according to claim 1, wherein the resilient branch, in the mounted and fixed position of the yoke on the adapter, extending next to an internal face of a front transverse end wall of the yoke.

7. An assembly comprising:
a wiper arm; and
an adapter according to claim 1,
wherein a yoke belonging to the wiper arm has a vertically oriented front transverse end wall that has a cavity, and wherein, in the mounted and locked position of the yoke on the adapter, the resilient branch extends longitudinally forwards through the cavity.

8. An assembly having a wiper blade and a connection system that joins the wiper blade to a driving arm, said connection system comprising:
a connector fixed to the wiper blade and an adapter according to claim 1, the connector and the adapter being joined together by articulation means.

9. An adapter for a motor vehicle windscreen wiper, comprising:

a body of longitudinally elongate shape which is delimited by two, longitudinal and vertical, external lateral faces and which is configured to be mounted in a complementary yoke of inverted-U-shaped cross section belonging to a wiper arm, the yoke having a pair of front locking pegs and an abutment surface which are able to cooperate with associated parts of the adapter in order to fasten the yoke to the adapter in a removable manner, wherein each of the external lateral faces of the body of the adapter having a front locking notch, each of which is able to receive an associated front locking peg of the yoke, the body of the adapter being provided with a resilient branch bearing an unlocking button which is able to cooperate with the abutment surface of the yoke in order to longitudinally immobilize the adapter in one direction with respect to the yoke, wherein the resilient branch extends longitudinally beyond a transverse end face of the body of the adapter, and wherein the unlocking button is offset vertically downwards with respect to an upper face of the body of the adapter, and wherein each of the longitudinal lateral faces of the body of the adapter has a front vertical slot that is open at a first end and a second end, each front vertical slot being able to receive an associated peg of the yoke in a sliding manner, each front vertical slot associated with one front locking notch, and each front vertical slot opening into the associated front locking notch.

\* \* \* \* \*